United States Patent
Kuhn

(10) Patent No.: US 11,802,582 B2
(45) Date of Patent: Oct. 31, 2023

(54) ANCHOR ROD ASSEMBLY WITH CONVEYING HEAD

(71) Applicant: Hilti Aktiengesellschaft, Schaan (LI)

(72) Inventor: Martin Kuhn, Germering (DE)

(73) Assignee: Hilti Aktiengesellschaft, Schaan (LI)

( * ) Notice: Subject to any disclaimer, the term of this patent is extended or adjusted under 35 U.S.C. 154(b) by 391 days.

(21) Appl. No.: 17/271,656

(22) PCT Filed: Aug. 20, 2019

(86) PCT No.: PCT/EP2019/072216
§ 371 (c)(1),
(2) Date: Feb. 26, 2021

(87) PCT Pub. No.: WO2020/048763
PCT Pub. Date: Mar. 12, 2020

(65) Prior Publication Data
US 2021/0324895 A1   Oct. 21, 2021

(30) Foreign Application Priority Data

Sep. 4, 2018   (EP) .................................... 18192405

(51) Int. Cl.
*F16B 13/14* (2006.01)

(52) U.S. Cl.
CPC ...... *F16B 13/141* (2013.01); *F16B 2013/148* (2013.01)

(58) Field of Classification Search
CPC ............ F16B 13/141; F16B 2013/148; F16B 13/065; F16B 13/066
USPC ........................................................ 411/42
See application file for complete search history.

(56) References Cited

U.S. PATENT DOCUMENTS

| | | | | |
|---|---|---|---|---|
| 3,082,657 A | * | 3/1963 | Fischer | F16B 13/063 411/42 |
| 3,257,891 A | * | 6/1966 | Lerich | F16B 13/065 411/79 |
| 4,193,246 A | * | 3/1980 | Schiefer | F16B 13/08 411/75 |
| 4,840,524 A | * | 6/1989 | Bisping | B60M 1/307 174/138 D |
| 4,983,083 A | * | 1/1991 | Froehlich | F16B 13/141 411/914 |
| 5,060,447 A | * | 10/1991 | Rinklake | F16B 13/141 411/75 |

(Continued)

FOREIGN PATENT DOCUMENTS

| | | |
|---|---|---|
| DE | 37 08 764 | 9/1988 |
| DE | 298 20 560 | 5/2000 |
| EP | 0 856 669 | 8/1998 |

OTHER PUBLICATIONS

International Search Report dated Nov. 5, 2019 in PCT/EP2019/072216, with English Translation, 5 pages.
Written Opinion dated Nov. 5, 2019 in PCT/EP2019/072216.

*Primary Examiner* — Flemming Saether
(74) *Attorney, Agent, or Firm* — Grüneberg and Myers PLLC

(57) ABSTRACT

An anchor rod assembly is used for being fastened into synthetic resin mortar and contains an anchor rod with a shall portion, a fastening portion, and a head having a cutting edge, and contains a sleeve-like additional element which surrounds the fastening portion at least in some regions.

17 Claims, 5 Drawing Sheets

(56) References Cited

U.S. PATENT DOCUMENTS

| | | | | |
|---|---|---|---|---|
| 5,104,266 A | * | 4/1992 | Daryoush | F16B 13/146 |
| | | | | 428/116 |
| 5,328,300 A | * | 7/1994 | Fischer | F16B 13/141 |
| | | | | 52/704 |
| 5,730,565 A | * | 3/1998 | Hein | F16B 13/143 |
| | | | | 411/258 |
| 5,740,651 A | * | 4/1998 | Vanotti | F16B 13/12 |
| | | | | 249/97 |
| 6,029,417 A | * | 2/2000 | Leibhard | F16B 13/141 |
| | | | | 52/698 |
| 11,598,085 B2 | * | 3/2023 | Fujita | F16B 13/141 |

* cited by examiner

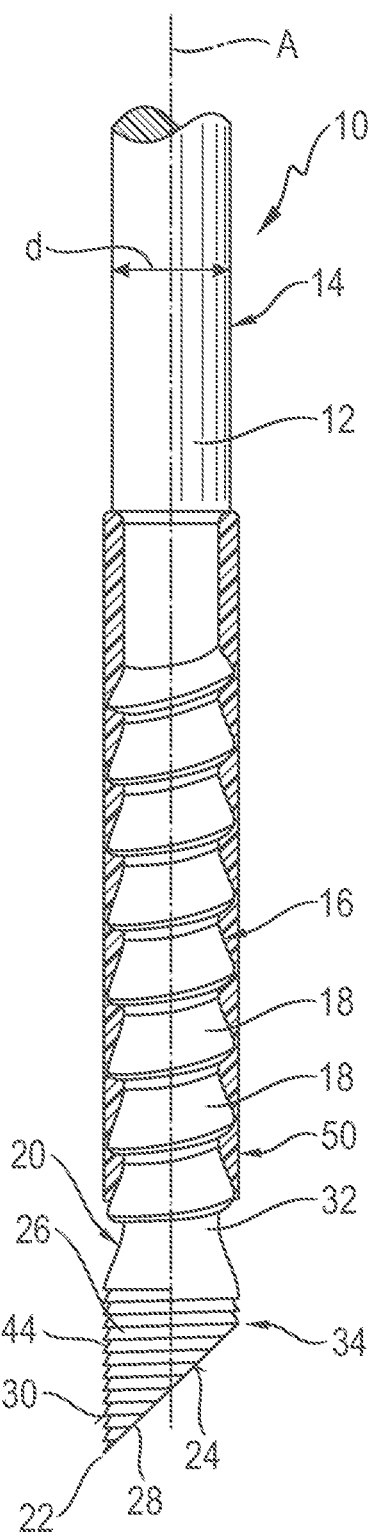

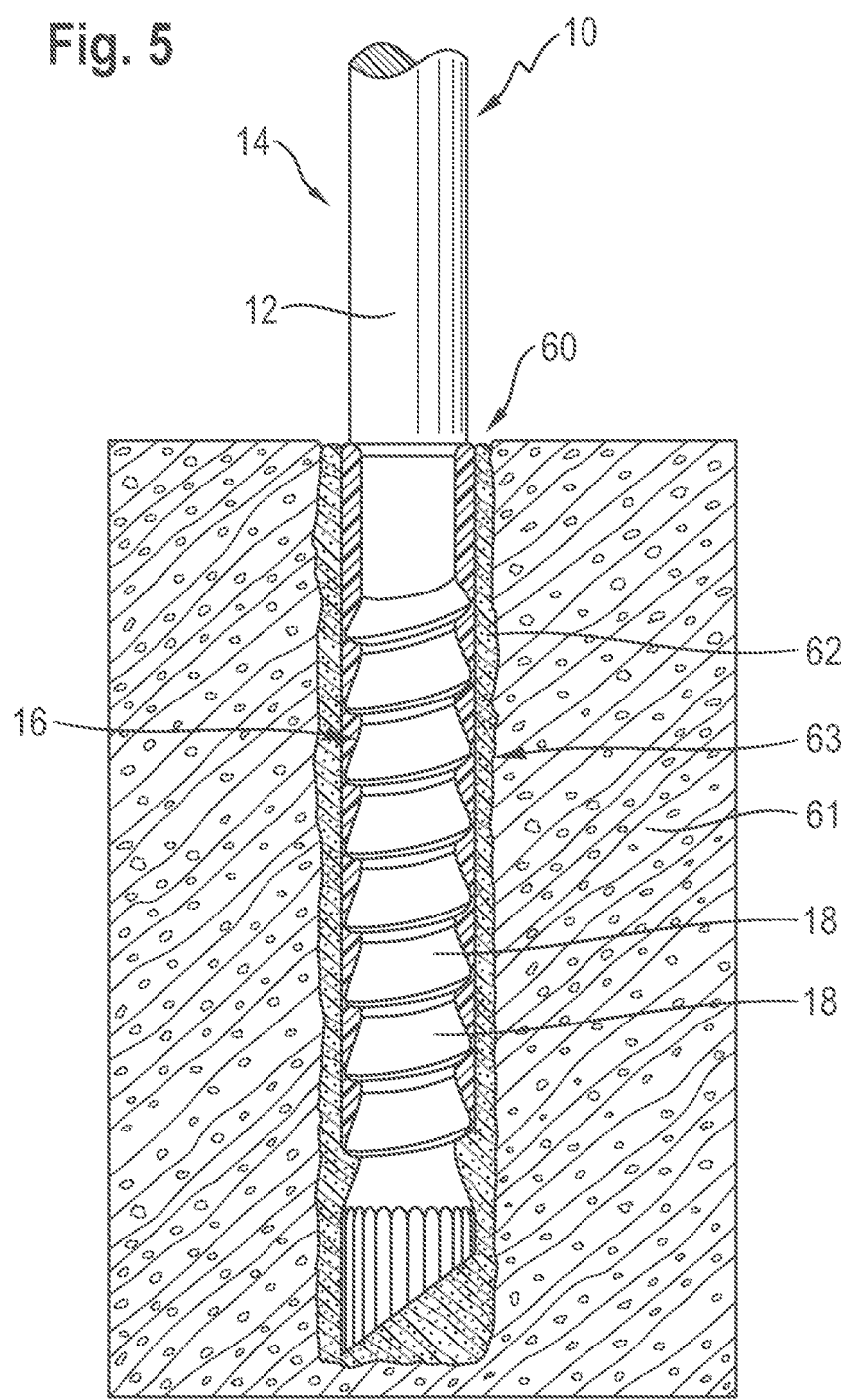

ANCHOR ROD ASSEMBLY WITH CONVEYING HEAD

CROSS-REFERENCE TO RELATED APPLICATIONS

This application is the National Stage entry under § 371 of International Application No. PCT/EP2019/072216, filed on Aug. 20, 2019, and which claims the benefit of European Application No. 18192405.1, filed on Sep. 4, 2018. The content of each of these applications is hereby incorporated by reference in its entirety.

BACKGROUND OF THE INVENTION

Field of the Invention

The invention relates to an anchor rod assembly for being fastened into synthetic resin mortar.

Description of Related Art

Anchor rods are known from the prior art which have a fastening portion having at least one conical portion. Anchor rods of this kind are usually used together with radically curing mortars, and very good load values can be obtained even in cracked and/or uncleaned boreholes.

Various packaging forms of two-component bonded mortar systems have become established on the market:
a) injection systems using two paste-like components consisting of radically curing materials, pressed through a static mixer, with the curing being carried out by the components being activated by the static mixer;
b) injection systems using two paste-like components consisting of materials curing bypolyaddition, pressed through a static mixer (epoxy injection mortar), with the curing being carried out by the components being activated by the static mixer;
c) bonded anchor capsules made of glass or plastic, in which, initiated by the setting process of the anchor rods, two liquid, dry or paste-like components are mixed together, with the curing reaction being triggered by the components coming into contact by being mixed within the receiving bore.

The radically curing materials, the materials curing by polyaddition and the components of the bonded anchor capsule are also referred to generally herein as synthetic resin mortars.

For the strength of the bonded mortar and in order to achieve the highest possible extraction values, it is important that the components of the mortar compound are intimately mixed. In the first two systems (a) and (b) which have just been described, this is done in a controlled manner by the static mixer. In the third system (c), the anchor rod rotates around the longitudinal axis (in the receiving bore) for the required mixing. The anchor rod also has the task of crushing the glass ampoules or the film pouches. This must be done to such an extent that the holding values are not adversely affected by larger remnants of the glass ampoules or the film adhering to the borehole wall. An anchor rod of this kind is known from EP 0856 669 A1, for example.

Compared to radically curing mortars, mortars curing by polyaddition, such as epoxy resins, have different mortar properties. In particular, there is significantly higher adhesive strength of the mortar and also significantly better tensile/compressive strength. This means that the mortar sleeve surrounding the anchor rod cannot be broken open when the anchor rod is fastened into mortar curing by polyaddition, although this is necessary for anchoring the anchor rod.

Anchor rods have hitherto been known which are intended for their particular use in one of the systems mentioned above. There is no known anchor rod that can be used universally, i.e. for all of the mentioned systems (a), (b) and (c).

SUMMARY OF THE INVENTION

The problem is solved by an anchor rod assembly according to the following embodiment:

An anchor rod assembly (10) for being fastened into synthetic resin mortar (62), comprising an anchor rod (12) which comprises a shaft portion (14), a special fastening portion (16) and a head part (20) having a cutting edge (24) at its free end (22), and comprising a sleeve-like additional element (50).

wherein the fastening portion (16), which is provided between the shaft portion (14) and the head part (20) is surrounded at least in some regions by the sleeve-like additional element (50).

The problem is solved by an anchor rod assembly according to claim 1.

BRIEF DESCRIPTION OF THE DRAWINGS

FIG. 3 shows a sectional view of an anchor rod assembly according to an alternative embodiment.

FIG. 5 shows the anchor rod assembly of FIG. 1 in a borehole filled with epoxy resin mortar.

DETAILED DESCRIPTION OF THE INVENTION

Figure 1:
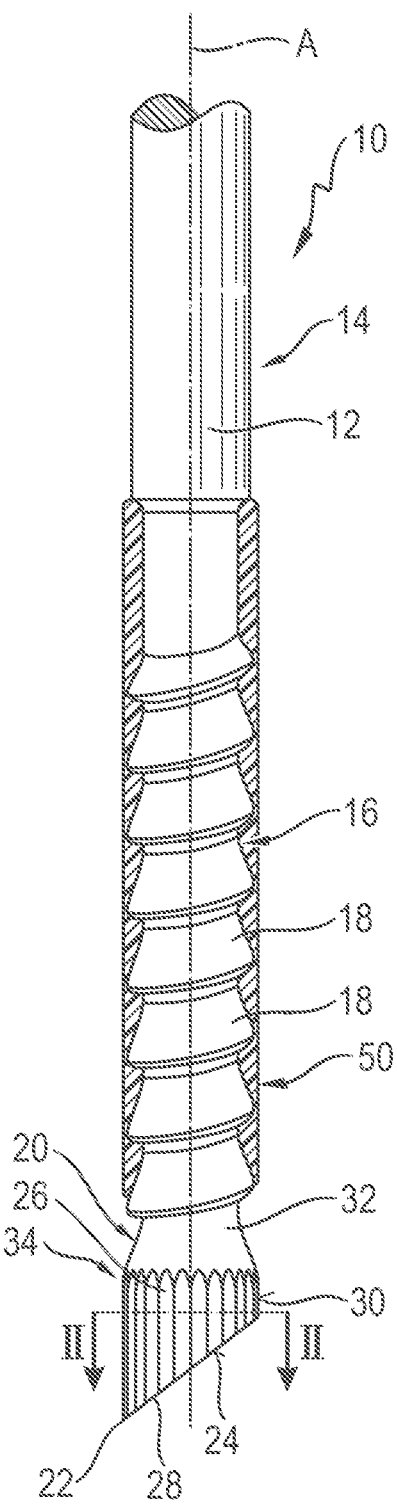
FIG. 1 shows a sectional view of an anchor rod assembly according to one embodiment.

The invention relates to an anchor rod assembly for being fastened into synthetic resin mortar, comprising an anchor rod which comprises a shaft portion, a special fastening portion and a head part, the fastening portion, which is provided between the shaft portion and the head part, being surrounded at least in some regions by a sleeve-like additional element, and the head part having a cutting edge at its free end. The head part also has an axial end, which is also referred to as the free end or the insertion end of the anchor rod assembly.

The special fastening portion preferably has cone-like portions. The cone-like portions support the subsequent expansion behavior of the bonded anchor, for example in cracked concrete when a receiving bore opens, and lead to better introduction of the expansion pressure over the length of the anchoring region.

If the anchor rod is used with a bonded anchor capsule, the cutting edge provided at the free end of the head part serves to break open and crush the bonded anchor capsule and serves both to mix its contents and to mix the contents with the crushed capsule. The cutting edge is not required for the use of the anchor rod with injection systems. The cutting edge does not adversely affect the function of the anchor rod in any way.

The cutting edge is expediently formed by a wedge-shaped bevel of the head part.

The circumferential surface of the head part is preferably profiled. This supports the mixing of the contents of the capsule and the mixing of the crushed capsule into the mortar compound when using anchoring capsules. This also supports the transport of the mixed compound when screwing the anchor rod away from the bottom of the borehole. When using the anchor rod with injection systems, the profiling of the circumferential surface of the head part supports the mixing of the mortar compound when the anchor rod is introduced into the borehole filled with the mortar compound.

In one variant of the invention, the profiling of the circumferential surface of the head part is thread-like profiling, the direction of rotation of which corresponds to the direction of rotation of the fastening portion profiled in the manner of a coarse thread. In the thread-like profiling of the head part, the mortar compound is transported and also mixed as in a screw conveyor.

In a further variant of the invention, the profiling of the circumferential surface of the head part is knurling in the form of substantially axially extending grooves which extend from the free front end to the fastening portion.

The surface of the anchoring region preferably has non-adhesive properties with respect to the synthetic resin mortar so that, for instance in the case of cracking, the anchor rod and the synthetic resin mortar can reliably separate from one another and the anchor rod can subsequently expand. This is achieved according to the invention by a sleeve-like additional element.

A basic concept of the invention is that the anchor rod is not embedded in the synthetic resin mortar exclusively by means of its fastening portion; rather, the sleeve-like additional element comes into direct contact with the synthetic resin mortar at least in some regions. The additional element surrounds the fastening portion over its entire circumference, at least in some regions, which ensures that, at least in a certain cross-sectional plane, the anchor rod assembly is embedded in the synthetic resin mortar exclusively by means of the additional element. In particular, the sleeve-shaped additional element is connected to the anchor rod in such a way that it can be easily separated from the anchor rod.

According to one aspect of the invention, the sleeve-like additional element consists of at least two different materials of different hardnesses, such as plastic or rigid foam or a combination of both.

The different materials, which have different hardnesses, form a support region and a tear region, the support region being formed from the harder material.

According to a further aspect of the invention, the tear region of the sleeve-like additional element is formed in the additional element, at least in one cross-sectional plane, by a plurality of radial projection portions which extend from the inside of the additional element to the outside thereof. The sleeve-like additional element substantially has an annular cross section. Said projection portions, which extend from radially inside to radially outside, ensure that there are no continuous portions of the support region in the circumferential direction. Accordingly, the radial projection portions formed from the softer material ensure that the additional element tears under a predefined load (predetermined intended breaking points), which is less than if only the same (hard) material were used.

According to one aspect, a circular segment element of the support region is provided between two adjacent projection portions. Accordingly, part of the support region alternates with part of the tear region in one cross-sectional plane such that uniform support of the additional element is ensured. In this cross-sectional plane, the additional element therefore consists only of the support region and the tear region, that is to say the circular portions and the radial projection portions.

Furthermore, the tear region and/or the support region can be formed in a plurality of cross-sectional planes of the additional element, in particular with the tear region and/or the support region extending, preferably continuously, over the entire axial length of the additional element. This also ensures that the additional element can tear over its entire axial length when a predetermined force acts on the additional element.

According to a further aspect of the invention, the additional element has been molded onto the anchor rod. As a result, the anchor rod assembly can be produced inexpensively, since the additional element surrounding the fastening portion can be connected to the anchor rod in a simple manner.

The additional element can comprise at least one plastics material. This plastics material can be a polyamide, for example, which forms the support region of the additional element. The further material which forms the tear region can also consist of a plastics material which has a correspondingly lower tear strength than polyamide, provided that polyamide is used as the material of the support region. Hard foam or a flexible plastic can also be used.

In particular, the additional element is a two-component injection-molded part. This ensures, in a simple manner, that the additional element formed from two different materials can be fastened to the anchor rod in a single process step.

In contrast, the anchor rod can be formed from a metal, in particular from steel. This ensures that the anchor rod can absorb or transmit the loads that occur.

Figure 2:
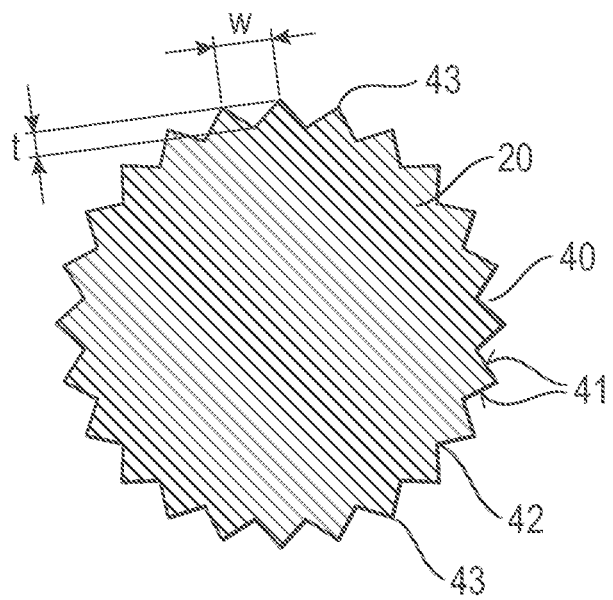
FIG. 2 shows a cross section of a region of the head part of the anchor rod assembly of FIG.
Figure 4:
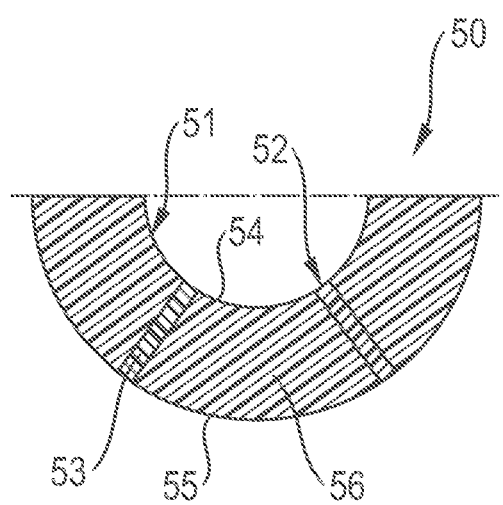
FIG. 4 shows a cross section of a region of the additional element of the anchor rod assembly of FIG. 1 or FIG. 2.
Figure 6:
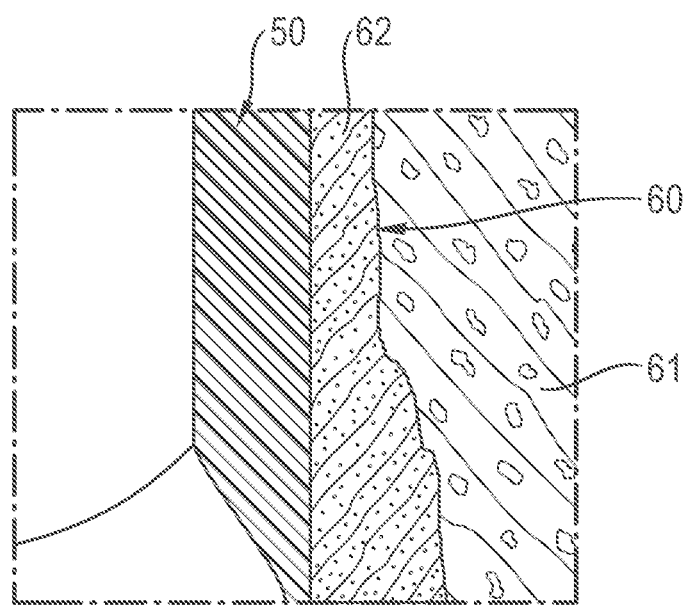
FIG. 6 shows a detail from FIG. 5.

Further advantages and properties of the invention can be found in the following description and the drawings to which reference is made. In the drawings:

FIG. 1 is a sectional view of an anchor rod assembly according to an embodiment of the invention;

FIG. 2 shows a cross section of a region of the head part of the anchor rod assembly from FIG. 1;

FIG. 3 is a sectional view of an anchor rod assembly according to an alternative embodiment of the invention;

FIG. 4 shows a cross section of a region of the additional element of the anchor rod assembly from FIG. 1 or 2;

FIG. 5 shows the anchor rod assembly according to the invention shown in FIG. 1 in a borehole filled with epoxy resin mortar; and FIG. 6 shows a detail from FIG. 5.

FIG. 1 shows an anchor rod assembly 10 which can be used in an epoxy or synthetic resin mortar.

The anchor rod assembly 10 has an anchor rod 12 which comprises a shaft portion 14, a fastening portion 16 and a mixing portion 20 designed as a head part.

The fastening portion 16 has a plurality of conical portions 18 which are arranged one after the other in series in the axial direction and which each extend with their narrower end toward the shaft portion 14.

The mixing portion 20 also has an axial end 22 which, in the embodiment shown, is substantially circular in cross section. The axial end 22 is also referred to as the free end of the anchor rod assembly 10.

In addition, the anchor rod assembly 10 comprises a sleeve-like additional element 50, which is shown in a partial sectional view in the embodiment shown.

The additional element 50 surrounds the entire fastening portion 16. In the embodiment shown, the additional element 50 extends in the axial direction from the end of the fastening portion 16 remote from the shaft portion 14 to the shaft portion 14, the additional element 50 abutting the transition between the fastening portion 16 and the shaft portion 14 and being fastened to the fastening portion 16.

In the embodiment shown, the additional element 50 is formed from two plastics materials, for example polyamide and a softer plastics material or foam. Accordingly, it is possible for the additional element 50 to have been molded onto the anchor rod 12, in particular onto the shaft portion 14, in a two-component injection-molding process in order to form the anchor rod assembly 10.

With reference to FIG. 4, in which the additional element 50 is partially shown in one cross-sectional plane, it can be seen that the additional element 50 has a support region 51 and a tear region 52, which are each formed by the different materials of the additional element 50.

The tear region 52 is formed by radial projection portions 53, two of which are shown. The radial projection portions 53 extend radially outward from a radially inner edge 54 of the additional element 50 to a radially outer outer edge 55 of the additional element 50. Accordingly, the radial projection portions 53, viewed in the radial direction, extend over the overall width of the additional element 50.

A circular segment element 56 is provided in each case between two adjacent radial projection portions 53 and is formed from the harder plastics material, for example from polyamide. The circular segment elements 56 each include an angular range of approximately 60° in the embodiment shown.

Accordingly, six radial projection portions 53 are provided in the additional element 50 according to the embodiment shown.

The radial projection portions 53 and the circular segment elements 56 are arranged alternately in the circumferential direction, so that a homogeneous support region 51 and a homogeneous tear region 52 are formed in the cross-sectional plane.

Several or fewer radial projection portions 53 may also be provided, such that, accordingly, more or fewer circular segment elements 56 are provided, each of which then includes a smaller or larger angular range.

The additional element 50 preferably has a plurality of such cross-sectional planes over its axial length, as shown in FIG. 4. Accordingly, the additional element 50 also has substantially homogeneous support and tear properties over its axial length.

In particular, the radial projection portions 53 and the circular segment elements 56 extend continuously in the axial direction of the additional element 50. Accordingly, the additional element 50 tears over its entire axial length, provided the predefined force has been achieved.

This means that the projection portions 53 and the circular segment elements 56 extend substantially continuously, i.e. between the two axial ends of the additional element 50.

The projection portions 56 generally form one or more intended breaking points of the additional element 50.

By means of the support region 51 and the tear region 52 and the corresponding material properties of the materials used, the intended breaking point or the intended breaking points can be formed in the additional element 50 and the required force at which the additional element 50 tears can be set.

In this respect, the additional element 50 separates in the region of the radial projection portions 53 or tears, as a result of which the anchor rod 12 enclosed by the additional element 50, in particular the fastening portion 16 of the rod, can engage in the torn parts of the additional element 50, such that the anchor rod 12 can be anchored in the torn parts of the additional element 50 with the mortar sleeve adhered thereto.

Accordingly, it is possible for the anchor rod 12 to be held in a borehole filled with synthetic resin mortar even if this would not otherwise be possible due to poor borehole cleaning and/or difficult application conditions.

A force which causes the additional element 50 to tear can be exerted on the anchor rod 12, in particular via a threaded portion (not shown here). The threaded portion can adjoin the shaft portion 14 or the shaft portion 14 transitions into the threaded portion.

The foremost portion of the anchor rod 12 facing the bottom of the borehole is designed as a head part 20, at the free front end 22 of which a cutting edge 24 is provided which extends approximately perpendicularly to the axis A of the anchor rod 12. To form the cutting edge 24, the front region of the head part 20 is provided with a bevel 28 which extends as far as the circumferential surface 30 of the head part 20.

A further significant difference between the two variants of the invention shown in FIG. 1 and in FIG. 3 is the formation of conveying means 26 which are provided in the cylindrical region 34 of the head part 20 which has the largest diameter. According to FIG. 1, the conveying means 26 consist of a knurling of the circumferential surface 30. The knurling forms approximately axially extending grooves 40 which extend from the free front end 22 equipped with the cutting edge 24 to the conical portion 32 of the head part 20.

It can be seen from the cross-sectional view (section through the plane II-II, as shown in FIG. 1) in FIG. 2 that the grooves 40 have flanks 41 which extend obliquely from the groove base 42 to the circumferential surface 30. There they meet the flanks 41 of adjacent grooves 40 at an acute angle and form a sharp edge 43 on the circumferential surface 30. The circumferential surface 30 provided with toothed strips in this way supports the crushing of the container, for example a plastic film, when the anchor rod rotates in the receiving bore. The depth t of the grooves is from approximately 0.5 mm to approximately 2.5 mm. The greatest width w of the grooves is from approximately 1 mm to approximately 3 mm.

In the embodiment shown in FIG. 3, the conveying means 26 consist of a thread-like profiling 44 which is provided in the circumferential surface 30 of the cylindrical region 34 of the head part 20. The thread-like profiling 44 has the same direction of rotation as the coarse thread 18 of the fastening portion 16.

FIGS. 5 and 6 show how an anchor rod assembly 10 inserted into a borehole 60 is received.

The borehole 60 is provided in a component 61 made of concrete or the like, the borehole 60 being torn in the concrete, for example, which is why the borehole 60 has been filled with a synthetic resin mortar 62 into which the anchor rod assembly 10 has been inserted.

In the cured state, the synthetic resin mortar 62 forms a mortar sleeve 63 which has formed around the additional element 50 and is connected thereto. The additional element 50 is formed in particular from a material or materials with which the synthetic resin mortar 62 connects as if the synthetic resin mortar 62 and the additional element 50 were a single material. The synthetic resin mortar 62 and the additional element 50 therefore form an integral or homogeneous bond.

Since the synthetic resin mortar 62 is cured, the anchor rod assembly 10, in particular the additional element 50, is firmly received in the synthetic resin mortar 62.

As soon as a force is applied to the anchor rod assembly 10 via the shaft portion 14 or the threaded portion (not shown), the additional element 50 with the mortar sleeve 63 connected thereto tears into individual parts. Due to the additional element 50, the mortar sleeve 63 has a smaller wall thickness than if the anchor rod were inserted directly into the borehole. This also makes it easier to break the mortar sleeve 63 under tensile loads.

Using the torn parts of the additional element 50, the anchor rod 12 can then build up an expansion effect which contributes to increasing the load-bearing capacity.

Due to the covering of the anchor rod 12, it is possible, using the anchor rod assembly 10, to fasten the anchor rod 12 in a borehole 60 filled with synthetic resin mortar, in particular with epoxy resin mortar, in particular even if the borehole 60 has not been cleaned beforehand.

Furthermore, because of the sleeve-like additional element 50, synthetic resin mortar 62 can be saved, which reduces the overall costs per fastening point.

In general, the additional element 50 is designed as a cap-like or sleeve-like element which can also be referred to as a wall plug, in particular a tearing wall plug.

The anchor rod explained using the example of two variants ensures reliable crushing of the container in which the synthetic resin mortar compound and its components are contained. Due to the geometric design of the mixing portion of the anchor rod according to the invention, the individual components of two- or multi-component mortar systems are intimately mixed. The mixed mortar compound is evenly distributed over the anchor region of the anchor rod. The geometry of the anchor rod according to the invention also supports the subsequent expansion behavior of the anchor rod, as a result of which, even in the case of a cracked substrate, it ensures sufficiently high holding values when the crack opens.

The invention claimed is:

1. An anchor rod assembly for being fastened into synthetic resin mortar, comprising:
    an anchor rod, which comprises a shaft portion, a special fastening portion, and a head part having a cutting edge at its free end, and
    a sleeve,
    wherein the fastening portion, which is provided between the shaft portion and the head part, is surrounded at least in some regions by the sleeve, and
    wherein the sleeve has two different materials which have different hardnesses and form a support region and a tear region, the support region being formed from a harder material.

2. The anchor rod assembly according to claim 1, wherein a conveying portion for the synthetic resin mortar is provided on the head part.

3. The anchor rod assembly according to claim 1, wherein the conveying portion is arranged in a region of the head part that has a largest diameter and is formed by profiling a circumferential surface.

4. The anchor rod assembly according to claim 3, wherein the profiling of the circumferential surface is knurling in the form of substantially axially extending grooves which extend from the free end to the fastening portion.

5. The anchor rod assembly according to claim 3, wherein the profiling of the circumferential surface is threaded profiling in the circumferential surface.

6. The anchor rod assembly according to claim 1, wherein the sleeve extends in the axial direction over the entire fastening portion.

7. The anchor rod assembly according to claim 1, wherein the sleeve extends in the axial direction into the shaft portion.

8. The anchor rod assembly according to claim 7, wherein the sleeve is fastened at least to the shaft portion.

9. The anchor rod assembly according to claim 7, wherein the sleeve is integrally fastened at least to the shaft portion.

10. The anchor rod assembly according to claim 1, wherein the tear region of the sleeve is formed in the sleeve, at least in one cross-sectional plane, by a plurality of radial projection portions which extend from the inside of the sleeve to the outside thereof.

11. The anchor rod assembly according to claim 10, wherein a circular segment element of the support region is provided between two adjacent projection portions.

12. The anchor rod assembly according to claim 1, wherein the support region is formed at least in one cross-sectional plane by a plurality of circular segment elements.

13. The anchor rod assembly according to claim 1, wherein the tear region and/or the support region is/are formed in a plurality of cross-sectional planes of the sleeve.

14. The anchor rod assembly according to claim 13, wherein the tear region and/or the support region extends over the entire axial length of the sleeve.

15. The anchor rod assembly according to claim 13, wherein the tear region and/or the support region continuously extends over the entire axial length of the sleeve.

16. The anchor rod assembly according to claim 1, wherein the sleeve has at least one predetermined intended breaking point.

17. The anchor rod assembly according to claim 1, wherein the sleeve comprises at least one plastics material.

\* \* \* \* \*